Patented Sept. 12, 1939

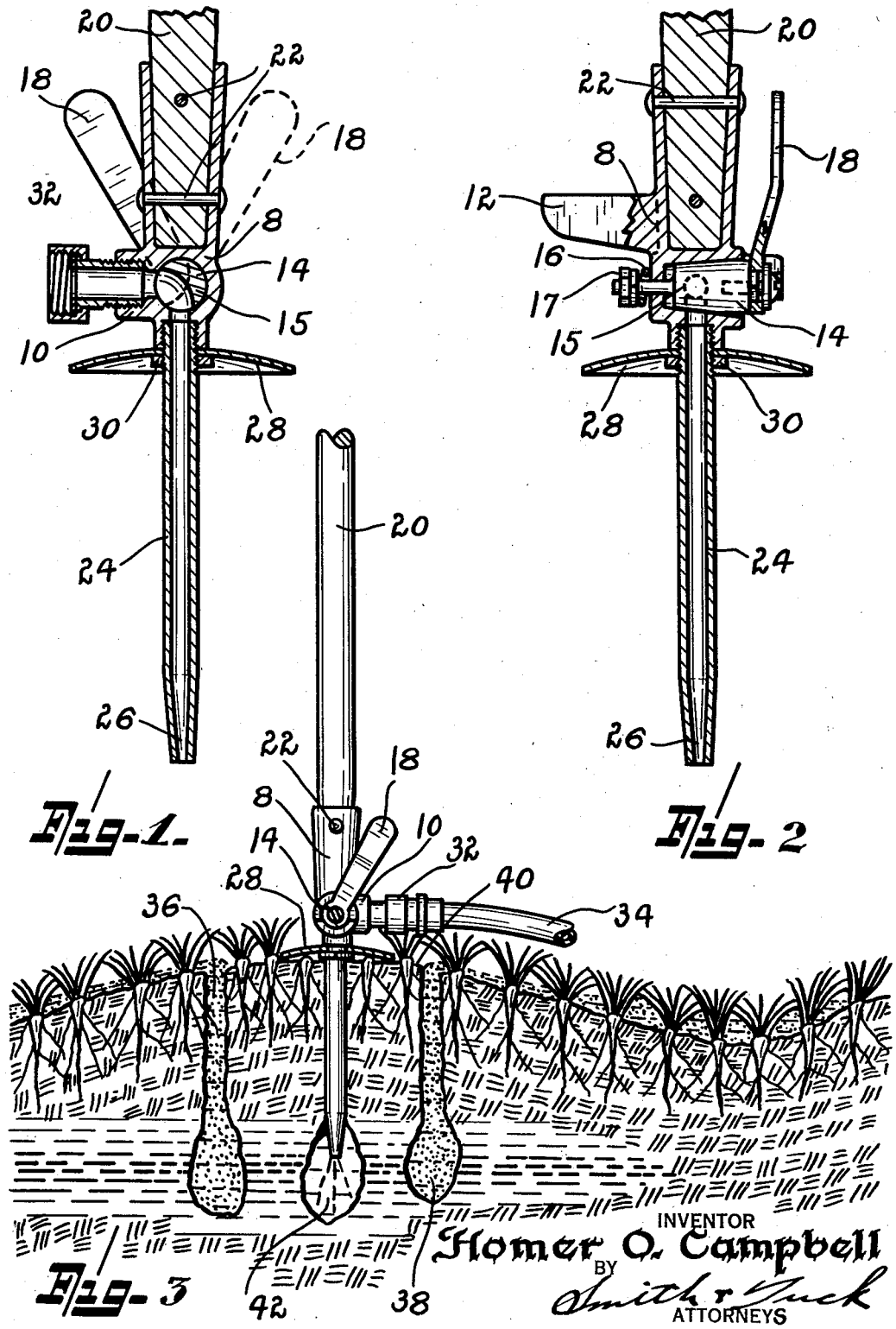

2,172,574

UNITED STATES PATENT OFFICE 2,172,574

METHOD OF RECONDITIONING LAWNS

Homer O. Campbell, Seattle, Wash.

Application December 11, 1936, Serial No. 115,433

3 Claims. (Cl. 47—48)

My present invention relates to an improved method of reconditioning lawns.

The average home owner has often been confronted with the problem of leveling his lawn. After it has been planted for several years hard spots usually develop in the somewhat elevated or slightly raised portions, where the ground has not settled as much as the surrounding lawn or, if the settling has been more pronounced in certain parts, hollows often form. These hard spots, sometimes of considerable area, are impervious to ordinary irrigation and their covering grass remains more or less brown in summer.

Normally, it is not desirable to dig up, level, and reseed the lawn, yet it is almost impossible to rectify this uneven condition without disturbing the grass. The usual practice at present employed is to pick it up as sod squares, level the ground, and then replace the sod. This is a difficult operation even for an experienced gardener and is not a practical solution for the average home owner.

In my present device I provide a method and means for softening and eliminating these hard spots and for the transfer of soil from beneath the grass roots to the surface, whence it is carried to lower levels, without at any time impairing the attractive appearance of the lawn.

My device consists essentially of a slender nozzle adapted for connection to a garden hose, which thus provides it with a source of water under pressure. A suitable handle is provided for the easy operation of the tool, and a cover and cover plate are incorporated in the nozzle unit in order to prevent a return flow of water up along the exterior of the nozzle. In using my lawn reconditioning device the nozzle with water under pressure running flush from the point, is used to bore a plurality of holes in the spot to be softened and lowered. After a number of holes have been bored in a given area a point centrally located with respect to these holes, is selected and the device pressed tightly into the soil so that the cover plate effectively prevents the return of the water along the nozzle and forces it through the narrow, softened sub-soil below the grass roots to come up and out the encircling holes, carrying the sub-soil with it in solution. This solution runs, or flows, by gravity to the lower levels, thus effectively filling the hollow areas with a light coating of sub-soil through which the grass continues to grow and which the grass hides. It follows, of course, if a considerable height is to be lowered, that the process should be repeated at intervals so as not to make too great a change at one time with the possibility of covering the grass in the lower hollows, with the solution of sub-soil. This washing away of the sub-soil of course lowers the hardened spot. When the water is finally turned off it will be found that the ring of holes which have been carrying the material upwardly and away will remain filled with the light sub-soil thus enriching the ground and providing a more porous surface so that water from normal sprinkling can enter, thus permanently correcting the hard spot condition.

Other and more specific objects will be apparent from the following description taken in connection with the accompanying drawing, wherein Figs. 1 and 2 are vertical sectional views of my construction and show a valve arrangement incorporated into the unit for more convenient operation of the same.

Figure 3 is a cross-section in elevation showing the theoretical operation of my device in lowering a hillock and filling a hollow, using the method I have devised.

Referring to the drawing, throughout which like reference characters indicate like parts, 8 designates the portion of my device which is in effect the frame work to which the other elements are attached. This is preferably made in a casting so that a suitable hose-attaching boss 10 can be conveniently provided as well as the foot rest 12 which is useful in forcing my device into the ground, and in maintaining a seal between the ground and plate 28. Further, in the modified form shown in Figures 1 and 2, this same casting can very easily house the shut-off valve 14. This valve can be of any convenient construction. The one employed is simple, consisting of the taper plug portion 15, a compression spring 16 tending at all times to seat the taper plug, a nut 17 retaining the spring and an operating handle as 18 which is convenient for use either by hand or by the foot.

As a matter of convenience a rather long upwardly extending handle 20 is provided which is secured within member 8 after the showing of Figure 2, wherein it seats in a taper and is held in position as by through rivets 22.

Secured to the lower end of member 8 as by screwing into the same, is the nozzle proper 24. This I prefer to form of tubing to the end that it can be light, will have a thin side-wall and can be conveniently formed into a restricted nozzle, at 26. This nozzle should be relatively small in diameter, so as to make its entrance into the ground more easily effected, and be, preferably, easily removable from casting 8 so that nozzles of different lengths may be interchanged.

Coaxially disposed upon nozzle 24 is a shield member 28. This I prefer to form, after the teachings of my various drawings, as a cupped plate which may be secured in place in any convenient manner as by the lock-washer 30 engaging threads on nozzle 24. Into boss 10 I provide the usual union member 32 so that an ordinary garden-hose as 34 may be conveniently secured thereto.

Method of operation

In using my lawn reconditioning device I find it most satisfactory to sink a plurality of holes 36 and 38 with the nozzle 24 not being pressed down sufficiently to cause plate 28 to engage the top surface 40 of the ground. This will permit water to come up around the nozzle which will enlarge these holes and provide an easy outlet for the sub-soil. When a number of holes as 36, 38 and the like have been made, substantially in a circle, the nozzle is then placed in a central position and another hole made. In this instance, however, in distinction from the other openings the nozzle is pressed firmly down with weight applied to foot rest so that plate 28 makes a firm engagement with the ground thus preventing any upflow of water along, or around, the nozzle. The continued applied force of the water, however, will soon saturate the sub-soil and produce a solution of the same which solution, being under pressure, will find its way out along the most convenient path, namely, out through the plurality of holes as 36 and 38. In this way the sub-soil underneath the hard spot, or hillock, will be actually washed out and carried up and out through the openings and will flow down through the grass after the showings of Figure 3.

When experience has indicated that sufficient earth has been thus removed from beneath the hillock, the nozzle is gradually pulled out of the central opening 42 and the loose sub-soil that is in solution will fill this opening as well as all of the other various holes that have been forced into the hillock, thus enriching the ground. These loosely filled holes also provide passageways so that during subsequent irrigation the water can flow down through them, thereby softening the hard spot rather than running off, and further softening the hollows as is generally the case when hard spots develop in lawns.

The natural weight of the sod and ground above the sub-soil, together with the properly applied weight of the user of my device, is normally sufficient to press the hard spot hillock down to its normal level. In this way it will be seen that the hillocks are actually leveled and at the same time that the surplus sub-soil has been moved into the adjacent hollows thus tending to level off the lawn. If, in extreme cases, one such operation is not sufficient it may be repeated at intervals until the desired grades are obtained.

The foregoing description and the accompanying drawing are believed to clearly disclose a preferred embodiment of my invention but it will be understood that this disclosure is merely illustrative and that such changes in the invention may be made as are fairly within the scope and spirit of the following claims.

I claim:
1. The steps in the method of leveling ground which consist in boring a series of proximate holes in the raised portion of the ground, and forcing fluid under pressure into a centrally disposed hole whereby the superfluous earth in solution is forced upwardly through the series of holes to the ground surface.

2. The method of leveling a lawn which consists in pre-forming a group of proximate holes in a raised portion of the lawn, and forcing fluid under pressure into one of said holes whereby sub-soil in solution is forced upwardly to fill the remaining holes of the group.

3. A method of lawn reconditioning which consists in preforming a group of proximate holes in the lawn extending from the ground surface to a point below the grass roots, and forcing fluid under pressure into one of said holes, whereby the remaining holes will be filled with loosely packed soil forming a porous surface conducive to the reception and maintenance of moisture.

HOMER O. CAMPBELL.